3,028,361
METHOD OF STABILIZING A POLYESTER MONOMER COMPOSITION WITH A SULPHONIUM SALT AND COMPOSITION THEREOF
Irving M. Abrams, Redwood City, Leo L. Benezra, Mountain View, and Robert D. Goold, East Palo Alto, Calif., assignors, by mesne assignments, to Diamond Alkali Company, Cleveland, Ohio, a corporation of Delaware
No Drawing. Filed Sept. 24, 1958, Ser. No. 762,947
8 Claims. (Cl. 260—45.4)

This invention relates to polymerizable polyester compositions; and more particularly to the incorporation of a sulfonium compound in polyester compositions to serve the dual function of stabilizing the polyesters before they are polymerized, and also of accelerating polymerization when a peroxide catalyst is added.

Polymerizable polyester compositions are extensively employed in industry for a wide variety of purposes, such as for making laminated or molded solid polyester articles. In order for the unpolymerized liquid polyester compositions to be commercially useful they must have a high degree of stability in storage, and also a high rate of polymerization after a catalyst has been added. Stability of such unpolymerized liquid polyester compositions is important in order to prevent premature gelation, and the requisite stability is generally obtained by adding a polymerization inhibitor during preparation of the polyesters. When the liquid polyester compositions are to be polymerized, a catalyst is added to initiate the polymerization. Also, the rate of polymerization is usually accelerated by the addition of another component commonly referred to as an accelerator or promoter.

Inhibitors that are useful for stabilizing unpolymerized liquid polyester compositions are well known, and they are effective in preventing premature gelation even during long periods of storage. Usually phenolic or quinonic inhibitors such as hydroquinone, quinone, and tertiary-butyl catechol are employed. However, such inhibitors not only stabilize the polyesters during storage, but they also tend to inhibit polymerization after a polymerization catalyst has been added to the polyester compositions. The degree to which such inhibitors hinder polymerization is proportional to the concentration of inhibitor. Consequently, it is generally desirable to use the lowest possible concentration of phenolic or quinonic inhibitor that is consistent with adequate polyester storage life.

Since unpolymerized liquid polyester compositions must generally have a lengthy storage life and yet be polymerizable upon addition of a catalyst without substantial inhibition of polymerization, the selection of the type and amount of stabilizer for the polyester presents a real problem in the art. One proposed solution to this problem is described in U.S. Patent No. 2,593,787 to Parker, wherein a quaternary ammonium salt is employed to stabilize unsaturated polyester compositions prior to polymerization. This patent indicates that the presence of quaternary ammonium compounds neither hinders nor aids polymerization after addition of the catalyst. U.S. Patent No. 2,740,765, also to Parker, discloses that quaternary ammonium compounds act as accelerators for the polymerization of polyesters provided that such compounds are added to the polyester in the presence of a peroxide catalyst and not added before the catalyst is incorporated in the polyester. However, there has been no compound known in the art that serves the dual function of stabilizing liquid polyester compositions during storage as well as accelerating polymerization when a catalyst is added to the stabilized composition.

Summarizing this invention, it has been found that incorporation of a sulfonium salt in an unsaturated liquid polyester composition prolongs the shelf life of the composition by inhibiting premature gelation, and in addition surprisingly accelerates polymerization of the polyester when a peroxide catalyst is incorporated in the stabilized composition. Polyester compositions that contain a sulfonium salt undergo no detectable change in polymerization characteristics even after prolonged storage at the usual ambient temperatures, and the sulfonium salt in the composition still acts as an accelerator when a peroxide catalyst is added.

At the usual elevated temperatures employed for polymerization of polyesters, sulfonium salts are more effective as accelerators than equal quantities or weight concentrations of the quaternary ammonium salts disclosed in the aforementioned patents. Although it might be expected that the so-called "pot life" at ambient temperatures after catalyst addition but prior to the application of heat would also be shorter with sulfonium salts than with quaternary ammonium salts, it has been found that such "pot life" is substantially longer when a sulfonium salt is included in the polyester composition at about room temperatures than when a quaternary ammonium compound is added in the presence of a peroxide catalyst for acceleration. As a result, the use of a sulfonium salt provides more time in which to work with the catalyzed resin at room temperature before gelation occurs.

In greater detail, the polymerizable polyester compositions to which this invention is applicable are well known, and they are more particularly defined as mixtures of unsaturated alkyd resins having a plurality of alpha-beta ethylenically unsaturated groups, with ethylenically unsaturated monomers. Alkyd resins of this type vary from a somewhat viscous liquid to a hard solid at room temperature, and they are conventionally dissolved in ethylenically unsaturated polymerizable liquids. The ethylenically unsaturated liquids that may be employed are either in the form of monomers or partially polymerized compounds, both for convenience designated herein as monomer. The ethylenically unsaturated liquid monomer renders the mixture fluid and also serves as a cross-linking agent for providing an infusible resin upon polymerization. Liquid polyester compositions are described in many United States Letters Patents, including Nos. 2,632,751, 2,646,416 and 2,652,383, as well as in "Industiral and Engineering Chemistry," vol. 46, No. 8, pages 1613 to 1643, August 1954.

The alkyd resin having a plurality of polymerizable alpha-beta ethylenically unsaturated groups may be prepared by reacting together a polyhydric alcohol with a polycarboxylic acid or acid anhydride which contains alpha-beta ethylenic unsaturation, both the acid and acid anhydrides being referred to herein as polycarboxylic acid. Saturated polycarboxylic acids are also frequently included in the reaction mixture to modify the properties of the resin. For economic reasons, the unsaturated polycarboxylic acids most commonly employed are maleic, usually in the form of the anhydride, and fumaric acid. Other alpha, beta unsaturated polycarboxylic acids which may be employed include itaconic, aconitic, citraconic and mesaconic acids, as well as the other acids mentioned in the foregoing article and patents. An acid often employed for modifying the properties of the polyester resin is phthalic acid usually in the form of the anhydride. Other such acids or acids with benzenoid unsaturation which behave as saturated acids in that the benzenoid unsaturated structure does not enter into any common ethylenic type polymerization reaction are often included in the reaction mixture for particular effects. Examples of such acids are isophthalic, adipic, azelaic, tetrachlorophthalic, sebacic, suberic, endomethylene tetrahydrophthalic and hexachloroendomethylene tetrahydrophthalic.

Typical polyhydric alcohols which are used in the synthesis of the alkyd resins include ethylene glycol, diethylene glycol, propylene glycols, dipropylene glycols and butylene glycols, as well as any of the polyhydric alcohols referred to in the foregoing patents and article. For some purposes, other glycols and even unsaturated polyhydric alcohols may be employed in the reaction mixture as modifying constituents.

In preparing the alkyd resin, one or more than one combination of the foregoing polycarboxylic acids and polyhydric alcohols may be utilized. The polycarboxylic acids of the character described are reacted with the polyhydric alcohols at elevated temperatures in an inert atmosphere. The reaction is usually carried out at a temperature of between 150° C. and 230° C., and the inert atmosphere may be provided by carbon dioxide or nitrogen gas. Generally, the total number of moles of alcohol exceeds the total number of moles of acid by about 5 to 20 percent in order to bring about complete esterification, although this proportion is not critical. A non-reactive solvent such as xylene is sometimes added to the reaction mixture. As the reaction proceeds, water is given off which is removed from the system.

The reaction is continued until essentially all of the water has been removed, and the acid number is reduced to from about 5 to 50, depending upon the specific polyester being made. Upon completion of the esterification reaction, the solvent, if any, is removed and the mixture is cooled. While the mixture is being cooled, the ethylenically unsaturated monomer and an inhibitor are generally added. After the monomer has been added, the resultant polyester varies from a somewhat viscous liquid to a hard solid at room temperature.

Ethylenically unsaturated monomers intermixed with the foregoing alpha, beta ethylenically unsaturated alkyd resins form solutions of polymerizable liquid polyesters that become cross-linked when they are polymerized. The liquid monomer is usually added before the polyester has cooled completely in order to facilitate easy mixing. The exact temperature of the alkyd resin at which the monomer and alkyd resin are intermixed depends upon the monomer and inhibitor used. Usually a temperature in the range of 60° C. to 150° C. is employed, although lower temperatures may be used.

Unsaturated monomers employed in the polyester compositions are well known and they are described and enumerated in the previously mentioned article and patents. Any polymerizable monomer containing one or more polymerizable $CH_2=C<$ groups may be utilized. Examples of such monomers are styrene, vinyl toluene, dimethyl styrene, diallyl phthalate, methyl acrylate, methyl methacrylate, vinyl acetate, divinyl benzene, and butadiene, as well as the monomers listed in the foregoing patents and article. Other special monomers may be used to obtain particular effects. For example triallyl cyanurate has been employed to give resins having high heat resistance, allyl diglycolate may be used to modify the refraction of resins, and diallyl phenyl phosphonate has been employed to impart fire resistance.

As is well known in the art, the amounts of the components of the useful liquid polyester compositions may vary widely. For most purposes, approximately two parts by weight of unsaturated alkyd resin to one part by weight of unsaturated monomer is suitable for polyester compositions. However, such proportions depend upon the use intended for the polyester composition. Usually, between about 10 and 50 percent by weight monomer is employed based on the total weight of polyester and monomer.

In accordance with the present invention, sulfonium compounds have been found to possess the dual properties of both stabilizing polyester compositions to prevent premature gelation during storage, and of accelerating polymerization upon addition of a peroxide catalyst. If the sulfonium compound is used as both the sole stabilizer to prolong shelf life and also as a polymerization accelerator, it is added to the polyester composition either during the reaction by which the alkyd resin is formed, or during cooling of the alkyd resin after it has been prepared in order to prevent gelation upon cooling, upon addition of the monomer or upon storage. Conveniently, the sulfonium salt can be mixed with the monomer and the alkyd resin can then be added to the monomer.

Alternatively, if another inhibitor or stabilizer is initially added to the alkyd resin before it has cooled and formed gel particles and before the monomer has been added, the sulfonium salt can either be added to the liquid polyester composition at any time prior to or after addition of the peroxide catalyst in order to serve as an accelerator. However, when the sulfonium compound is added as an accelerator at the time of polymerization, it should not be mixed with the peroxide catalyst, but instead it should be added to the polyester separately since a violent reaction can occur when the sulfonium salt is mixed directly with the peroxide catalyst.

Any sulfonium salt of an acid that has an ionization constant greater than about $1 \times 10^{-5}$ may be employed as a stabilizer and polymerization inhibitor for polyester compositions. Sulfonium salts are characterized by the following formula:

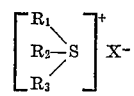

In this formula $R_1$, $R_2$ and $R_3$ are organic radicals, S is sulfur, and X is an acid radical. The organic radicals may be aliphatic or aromatic in nature; they may all be the same or they can be different. For example the organic radicals $R_1$, $R_2$ and $R_3$ can be alkyl, cycloalkyl, aryl or any of these radicals substituted with such substituents as alkoxy groups, cycloalkoxy groups, aryloxy groups, OH, CHO, CO, NO, $NO_2$, $NO_3$ and CN. In addition, the R groups can be saturated or unsaturated, long chain or short chain.

Also X may be any anion derived from an acid that has an ionization constant greater than about $1 \times 10^{-5}$. For example, X can be the acid radical derived from simple inorganic acids such as hydrochloric, hydrobromic, nitric, nitrous, sulfuric, sulfurous, and phosphoric. Furthermore, the X may be the anion of organic radicals such as acetic, propionic, butyric, oxalic, and tartaric. The following are some specific examples of such salts:

Trimethylsulfonium chloride
Trimethylsulfonium acetate
Dimethylethylsulfonium chloride
Dimethylpropylsulfonium chloride
Dimethylbutylsulfonium chloride
Diethylmethylsulfonium chloride
Dimethylbenzylsulfonium chloride
Dimethylbenzylsulfonium bromide
Dimethylbenzylsulfonium sulfate
Dimethylbenzylsulfonium phosphate
Dimethylbenzylsulfonium acetate
Dimethylbenzylsulfonium tartrate
Dimethylbenzylsulfonium nitrate
Diphenylmethylsulfonium bromide
Diphenylmethylsulfonium iodide
Diphenylmethylsulfonium chloride
Diphenylpropylsulfonium bromide
Triphenylsulfonium chloride
Tribenzylsulfonium sulfate
Tritolylsulfonium chloride
Trixylylsulfonium propionate
Dimethylhydroxyethylsulfonium chloride
Methylhydroxyethylphenylsulfonium phosphate
Methyl-ethyl-n-propylsulfonium chloride Such sulfonium salts are well known and are readily prepared. Methods of preparing various sulfonium salts are disclosed on page 867 of "Organic Chemistry" by Gilman, vol. I, 2nd edition, John Wiley and Sons, New York, 1943.

Generally, sulfonium salts are solid at room temperature. Consequently, they are preferably dissolved in suitable solvents before they are added to the polyester compositions in order to avoid the necessity of dissolving the salts in the polyester. However, the sulfonium salts can be dissolved directly in the polyester, the alkyd resin alone, or the monomer. Suitable solvents which can be employed for dissolving sulfonium compounds are well known and they include water, alcohols such as methanol, ethanol, propanol, butanol, ethylene glycol, propylene glycol, hydrocarbons such as benzene, toluene, xylene, hexane and heptane, as well as chlorinated hydrocarbons such as carbon tetrachloride, chloroform, perchloroethylene, and benzyl chloride. The solvent used depends upon the nature of the sulfonium salt.

When the sulfonium salt is used as the sole retardant or stabilizer for the polyester composition, between about 0.01 percent and one percent by weight of sulfonium salt should be employed based on the total weight of the alkyd resin and monomer. If less than about 0.01 percent by weight of sulfonium salt is employed as the sole polymerization retardant, the polyester composition tends to gel in a very short period. On the other hand, if more than about one percent by weight sulfonium salt is employed, the cure rate of the polyester composition upon polymerization is substantially reduced. Shelf-life tests demonstrate that a polyester composition without an inhibitor will gel in a relatively short period compared to the gel time when a sulfonium salt is incorporated in the polyester.

Although sulfonium salts may be employed in liquid unpolymerized polyester compositions as the sole stabilizer during storage, small amounts of other polymerization retardants or stabilizers may be incorporated in the polyester compositions for providing a particularly lengthy shelf life. Best results in producing a polyester composition that can be stored for very long periods without gelation are obtained when a retardant selected from the group consisting of dihydric phenols and quinones is included in the polyester in addition to the sulfonium salt. The mixture of this type of retardant with sulfonium salts produces a synergistic effect in providing a substantially greater shelf life than is obtained with a sulfonium or phenolic or quinonic inhibitor used alone. Such dihydric phenol and quinone inhibitors are well known, and they include hydroquinone, quinone, tertiary butyl catechol, 3-methyl catechol, and p-benzoquinone among others. However, any of the well known polymerization retardants, stabilizers or inhibitors for polyester compositions may be added in addition to the sulfonium salt. For example, such compounds include phenols, phenolic resins, aromatic amines, antioxidants such as pyrogallol, tannic acid, ascorbic acid, benzaldehyde, alpha-naphthol, resorcinol, sulfur compounds, and substituted hydrazines.

In polyester compositions that contain the sulfonium salt as a stabilizer together with another retardant or inhibitor, such as a dihydric phenol or quinone, between about 0.0005 percent and one percent by weight sulfonium salt based on the total weight of the alkyd resin and monomer is utilized to provide effective additional shelf life to the composition. Less than 0.0005 percent by weight of sulfonium salt has very little effect on the shelf life, whereas more than one percent by weight increases cost without significant improvement over lower concentrations. Concentrations of sulfonium salt even as low as 0.002 percent by weight have been found to double the shelf life of polyester compositions during storage at ambient temperatures.

If it is desired to employ another retardant in addition to the sulfonium salt, the amount of such retardant or inhibitor may vary between about 0.005 percent to 0.3 percent by weight of inhibitor, such as dihydric phenol or quinone, based on the weight of alkyd resin and monomer. Amounts of such inhibitors less than 0.005 percent by weight do not provide a shelf life of suitable duration, whereas polymerization is undesirably inhibited if more than 0.3 percent by weight of such inhibitor other than sulfonium is employed. The foregoing range of proportions of such other inhibitors also is used when the sulfonium salt is not added to the polyester composition as a polymerization inhibitor during storage, but is added as an accelerator before or after addition of the catalyst. In such cases, the other type of inhibitor provides the sole inhibiting effect and the sulfonium salt is utilized as an accelerator.

Although commercial polyester compositions are generally required to have a long storage life, it is also important that such compositions be curable within a short period of time. In order to achieve rapid polymerization and cure, the sulfonium salt hereof is incorporated in the polyester composition. Concentrations of sulfonium salt between about 0.0005 percent by weight and one percent by weight based on the weight of alkyd resin and monomer provide the desired increase in the rate of polymerization. Below about 0.0005 percent by weight of sulfonium salt provide only a small acceleration of the polymerization, whereas above about one percent by weight sulfonium salt there is a reversal of the acceleration trend.

In other words when the sulfonium salt is used either as an inhibitor together with another type inhibitor, or as an accelerator for polymerization of the polyester composition, the concentration of sulfonium salt should be between about 0.0005 percent by weight and 1 percent by weight base on the weight of polyester. If the sulfonium salt is employed as the sole inhibitor, at least about 0.01 percent by weight should be used to provide the desired inhibiting effect.

As previously explained, it has been found that low concentrations of a sulfonium salt will provide a longer pot life at ambient temperatures of a polyester composition that contains hydroquinone inhibitor and cumene hydroperoxide catalyst, than will other commonly used accelerators or promoters. However, when the temperature of this same composition is raised to 80° C., the composition gels in a substantially shorter time than the gel time of the composition without the sulfonium salt. Furthermore, the presence of a small amount of sulfonium salt greatly reduces the time required to cure such a polyester composition.

A peroxide catalyst is added to the liquid polyester composition when it is desired to promote the polymerization of the composition. Such peroxide catalysts function by liberating free radicals under the influence of heat or chemical combination, thereby causing addition polymerization to occur at the sites of the double bonds in the unsaturated alkyd resins. Any of the well known peroxide catalysts which term as used herein includes the hydroperoxides, may be used. Typical examples of such catalysts are benzoyl peroxide, 2,4-dichlorobenzyl peroxide, methylethylketone peroxide, lauroyl peroxide, cyclohexanone peroxide, cumene hydroperoxide, paramenthane hydroperoxide, tertiary-butyl hydroperoxide and tertiary-butyl perbenzoate. It has been found that in the systems hereof containing a sulfonium salt, the accelerating effect obtained is greater with hydroperoxides than with peroxides.

The concentration of peroxide catalyst added to the polymerizable polyester composition is the same as conventionally employed for catalyzing such compositions. Generally between about 0.1 percent and 10 percent by weight of peroxide catalyst is employed based upon the total weight of liquid polyester in the composition, and perferably between about 0.3 percent and 5 percent of catalyst is utilized.

In addition to the foregoing compounds, other additives may be included in the composition in accordance with conventional practice. For example, pigments and fillers are often incorporated in such polyester compositions. Also, other known accelerators or promoters can be added to the composition at the time of polymerization.

Since the sulfonium salt is both a stabilizer before a catalyst is added and an accelerator for polymerization after incorporation of the peroxide catalyst and elevation of the temperature, it is of course preferable to employ a sulfonium salt in the stabilizing component. If this is done, the desirable properties of the sulfonium salt both as a stabilizer and accelerator are utilized. However, it is also generally advantageous to use a phenolic or quinonic auxiliary inhibitor because the optimum concentration of sulphonium salt used as inhibitor does not correspond to the optimum concentration as accelerator. After the inhibitor has been added to the liquid polyester composition, the product has a long shelf life, and it can be stored for an appreciable period of time without premature polymerization or gelation.

The peroxide or hydroperoxide catalyst is usually added to the polymerizable liquid polyester composition shortly before the composition is to be polymerized. If a stabilizer other than the sulfonium salt hereof was employed to stabilize the liquid polyester composition, the sulfonium salt may be added at about the time of polymerization, either before or after addition of the catalyst, in order to accelerate the polymerization reaction and increase the rate of cure. After the accelerator and catalyst have been added to the liquid polyester composition, the polyester is generally used as soon as practical. In order to hasten the gel time and rate of cure of the catalyzed polyester composition, the temperature should be elevated, preferably above 60° C., whereupon the composition rapidly forms a gel and then hardens and cures until a solid rigid article is formed.

The following are examples of the preparation and utilization of liquid polyester compositions incorporating the sulfonium salt as a stabilizing and retarding agent, and as an accelerator. The term "p.p.m." as used in the examples means parts by weight per million.

EXAMPLE 1

An alpha, beta unsaturated alkyd resin was prepared by mixing 2.2 moles of propylene glycol, 0.8 mole of maleic anhydride and 1.3 moles of phthalic anhydride in a glass kettle fitted with a vapor outlet tube to remove water, and a reflux condenser to retain the glycol. The mixture was heated gradually to a temperature of 200° C. with vigorous stirring and with addition of $CO_2$ gas. Heating was continued until water ceased to evolve and the acid number reached 35.

Next, the reaction mixture was gradually cooled and at 180° C., 50 p.p.m. hydroquinone inhibitor (0.005 percent by weight based on the weight of the alkyd resin) was added. The mixture was then divided into two equal parts A and B. At 150° C., 1000 (0.1 percent by weight) triphenylsulfonium chloride was stirred into part A only. At 85° C., sufficient styrene monomer containing 10 p.p.m. (0.001 percent by weight) t-butyl catechol inhibitor was added to both part A and part B to give a mixture containing 35 percent by weight styrene monomer and 65 percent by weight alkyd resin based on the weight of styrene monomer and alkyd resin in the mixture.

The resultant part A polyester composition containing the sulfonium compound was cooled to room temperature and subjected to shelf-life tests. Such tests demonstrate that the polyester mixture of part A was stable for a period of 20 days at 65° C. (normally equivalent to 20 months at 25° C.).

The part B polyester mixture, which did not contain triphenylsulfonium chloride, formed gel particles immediately upon addition of the styrene monomer and the whole mass set to a gel within 15 minutes after the styrene addition. This demonstrates that in the absence of the sulfonium compound, the small amounts of hydroquinone inhibitor and t-butyl catechol inhibitor incorporated in the mixture were insufficient to prevent premature gelation of the polyester.

EXAMPLE 2

Four samples of fifty grams each were made using 32.5 gms. of the alkyd resin prepared in Example 1 and 17.5 gms. styrene, but without hydroquinone. Triphenylsulfonium chloride inhibitor was added to the alkyd resin in the amounts specified below before the resin was mixed with syrene. The four samples were then placed in a 180° F. water bath with stirring for 10 min. In that time, the resin completely dissolved in the styrene to form a polyester composition.

The polyester was removed from the 180° F. bath and the samples were deposited in vials and stoppered. The vials were then placed in a 65° C. oven and cheked daily until gelled in order to obtain accelerated shelf-life tests. The following table gives the results of the tests:

| Sample No. | Parts per Million Sulfonium Salt | Shelf Life (Time to Gel) (65° C.) |
|---|---|---|
| 1 | 0 | Less than 20 hours. |
| 2 | 1,000 | 2.5–3 days. |
| 3 | 2,000 | 2.5–3 days. |
| 4 | 5,000 | 3–4 days. |

These tests illustrate the effectiveness of a sulfonium salt used alone as an inhibitor or retarder for the polymerization of polyester compositions before addition of a catalyst.

EXAMPLE 3

The procedure outlined in Example 1 was repeated except that 0.6 mole of diethylene glycol, 1.5 moles of propylene glycol, 1.0 mole of maleic anhydride and 1.0 mole of phthalic anhydride were reacted to form the alpha, beta unsaturated alkyd resin. The acid number following esterification was 28. Twenty p.p.m. tertiary butyl catechol (0.002 percent by weight based on the weight of alkyd resin) was added at 185° C.

The mixture was then equally divided into part A and part B. One thousand p.p.m. of triphenylsulfonium chloride was added to part A, and 1000 p.p.m. of dimethylbenzylsulfonium chloride was added to part B. Styrene (containing 12 p.p.m. of t-butyl catechol) was added to both part A and part B at 85° C. to give a monomer concentration of 36 percent by weight.

Accelerated shelf-life tests at 65° C. gave 19 days for part A stabilized with the triphenylsulfonium chloride, and 15 days for part B stabilized with dimethylbenzyl sulfonium chloride. These are equivalent to at least 18 months stability at ordinary room temperature (20–25° C.).

EXAMPLE 4

This experiment shows the effect of sulfonium compound concentration on the stabilization of a polyester composition. An alkyd resin was prepared in the same manner and using the same composition as in Example 1. At the conclusion of the esterification, the resin was divided into three portions and 20, 100 and 1000 p.p.m. of triphenylsulfonium chloride based on the weight of alkyd resin was added to the respective portions. Shelf-life tests at 65° C. were made. Results are given in the following table and are compared with a sample containing 60 p.p.m. of hydroquinone.

*Table 1*

| Additive | Shelf-Life at 65° C., days |
|---|---|
| 20 p.p.m. triphenylsulfonium chloride | 5 |
| 100 | 9 |
| 1,000 | 24 |
| 60 p.p.m. hydroquinone | 3 |

EXAMPLE 5

This example illustrates the comparative effects of triphenylsulfonium chloride and trimethylbenzylammonium chloride on the gel temperature, length to peak exotherm, peak exotherm temperature and pot life of a polyester resin composition containing these ingredients.

A resin was prepared having the composition described in Example 1. At 190° C., 75 p.p.m. of hydroquinone was added, and the resin was divided into portions A and B. At about 90° C., styrene containing triphenylsulfonium chloride was added to portion A, and styrene containing trimethylbenzylammonium chloride was added to portion B. In both cases, the styrene was 35 percent by weight of the total mix. The triphenylsulfonium chloride was present in a concentration of 135 p.p.m. in portion A, and the concentration of trimethylbenzylammonium chloride was 360 p.p.m. based on the weight of the mixture.

After thorough mixing and cooling, the two resins of portions A and B were subjected to a number of standard tests to determine their behavior under the influence of a catalyst and heat. The catalyst, consisting of 0.6 percent by weight cumene hydroperoxide and 0.5 percent by weight benzoyl peroxide was added to the polyester, thoroughly mixed and the solution was poured into a small vial. The vial was placed in a water bath at 180° F. and the data shown in the following table were noted. The gel time is the time which elapses between immersion of the sample in the bath and the moment the liquid resin can no longer be poured, and the gel temperature is noted at this point. After gelation, the temperature continues to rise and reaches a peak after which it begins to drop. The time to reach this peak (LPE), and the temperature at the peak (PE) are recorded. Also, the "pot life" or the period during which the catalyzed, unheated sample remains fluid is noted. In order to provide a control, one sample was run without employing any accelerator. The results are given in the following table.

|  | Control Resin | Polyester Resin Containing 360 p.p.m. Trimethylbenzylammonium chloride | Polyester Resin Containing 135 p.p.m. Triphenylsulfonium-chloride |
| --- | --- | --- | --- |
| Gel time, min | 8.2 | 4.8 | 4.3 |
| Gel temp., °F | 183 | 170 | 169 |
| LPE, min | 14.2 | 9.4 | 9.1 |
| PE, °F | 393 | 388 | 388 |
| Pot Life, hrs | 16 | 2 | 3 |

It is apparent that the presence of the sulfonium accelerator nearly halves the gel time compared to the sample in which no accelerator was used. The sulfonium accelerator produces a somewhat faster reaction than the quaternary ammonium compound even though the concentration of the sulfonium was less than half that of the quaternary ammonium compound. In spite of its faster action under the influence of heat and catalyst, the pot life of the sulfonium accelerated resin is longer.

The resin containing 135 p.p.m. of triphenylsulfonium chloride was stored for a period of 8 weeks without catalyst and the above described tests were repeated. The results were essentially unchanged, indicating the lack of drift of such compositions.

EXAMPLE 6

This example demonstrates the effect of concentration on the acceleration of the gelation and cure. The resin employed had the composition described in Example 3, and it was inhibited with 137 p.p.m. of quainone. The resin was divided into four equal portions which contained 0, 8.3, 120 and 1000 p.p.m. respectively, of triphenylsulfonium chloride. Cumene hydroperoxide catalyst was added at a concentration of 1 percent. The tests were run with the four portions placed in vials immersed in a water bath maintained at 180° F. The results are given in the following table.

| Concentration of Triphenylsulfonium Chloride, p.p.m. | 0 | 8.3 | 120 | 1,000 |
| --- | --- | --- | --- | --- |
| Gel time, min | 47.5 | 21.2 | 8.5 | 9.5 |
| Gel temp., °F | 180 | 182 | 183 | 185 |
| LPE, min | 67.5 | 39.0 | 21 | 14 |
| Peak temp., °F | 323 | 341 | 356 | 384 |
| Pot Life at 75° F | 3 days | 14 hrs. | 12 hrs. | 3.5 days |

It is apparent that as little as 8.3 p.p.m. of sulfonium accelerator shortened the gel time to less than half. With 1000 p.p.m., the gel time is about ⅕ of the control sample. All of the resulting castings were clear, hard, free of odor and water-white.

EXAMPLE 7

An alkyd resin was prepared in accordance with Example 1 and again divided into four portions to each of which were added 137 p.p.m. of quinone and 30 percent by weight of styrene monomer. Diethylbenzylsulfonium chloride was then mixed into the polyester samples in concentrations of 0, 25, 120 and 1000 p.p.m. (based on the total polyester mixture). Each of the samples was catalyzed with 1.0 percent para-menthane hydroperoxide and the gelation characteristics were determined. The results are given in the following table.

| Concentration of Diethylbenzylsulfonium chloride, p.p.m. | 0 | 25 | 120 | 1,000 |
| --- | --- | --- | --- | --- |
| Gel time, min | 39.5 | 14.5 | 8.2 | 8.8 |
| Gel temp., °F | 182 | 182 | 181 | 185 |
| LPE, min | 58.5 | 32.5 | 23.5 | 14.0 |
| Peak temp., °F | 334 | 345 | 349.5 | 376 |
| Pot life at 25° C | 3.5 days | 2.5 days | 16 hrs. | 10 hrs. |

Again the gel times were substantially lowered by the presence of the sulfonium accelerator. Similarly, the cure time was shortened as indicated by the length to peak exotherm and the higher peak temperatures.

EXAMPLE 8

In this example, the sulfonium compound is added to the ingredients prior to esterification. A resin was prepared with 1.0 mole ethylene glycol, 1.2 moles butylene glycol, 0.8 mole maleic anhydride, 1.1 moles phthalic anhydride, and 0.1 mole adipic acid. A quantity of dimethylhydroxyethylsulfonium chloride was added to the mixture prior to heating to give a weight concentration of 0.05 percent based on the total weight of the ingredients in the kettle. Heating and stirring was allowed to proceed as described in Example 1 until the evolution of water ceased and the acid number was 26. A similar resin was prepared in which the sulfonium additive was omitted. At the conclusion of both esterifications, tertiarybutylcatechol in a concentration of 100 p.p.m. was added to retard gelation, and 40 parts of methyl methacrylate (containing 60 p.p.m. hydroquinone) was mixed with 60 parts of the polyester. After cooling and several days of storage, the two resins were tested by running gel times. With 1 percent tertiary-butyl hydroperoxide as catalyst, the gel times (when immersed in a water bath at 180° F.) were 10.5 minutes for the sample containing the sulfonium salt, and 36 minutes for the control sample that did not incorporate the sulfonium salt.

EXAMPLE 9

Another sulfonium salt accelerator was made by condensing thiophene with dimethyl sulfate and recrystallizing the resulting salt from methanol. This sulfonium salt was added in a concentration of 50 p.p.m. to one portion of the alkyd resin described in Example 3 and 32 percent by weight styrene monomer was added to this portion as well as to a control that did not contain the sulfonium salt. At 180° F. with 1 percent cumene hydroperoxide catalyst the sulfonium salt reduced the gel time to one-half the time required for the control sample.

EXAMPLE 10

The composition described in Example 1 was inhibited with 75 p.p.m. hydroquinone, and mixed with styrene monomer to give a polyester composition having a 65 to 35 proportion of alkyd resin to styrene. 200 p.p.m. (0.02%) of dimethyllaurylsulfonium iodide (produced by condensing methyl iodide with lauryl mercaptan) was added to one portion of the polyester composition, and no accelerating agent was incorporated in the other part of the polyester. The portion containing the sulfonium salt gelled in 4.1 minutes at 180° F. with 1 percent tertiary-butyl hydroperoxide catalyst, and 14.5 minutes under the same conditions for the portion that did not contain the sulfonium salt.

We claim:

1. The method of producing a polymerized polyester from a polymerizable liquid polyester composition, which comprises providing a stabilized polymerizable mixture consisting essentially of (A) a polyester of a glycol and an alpha-beta ethylenically unsaturated dicarboxylic acid, and (B) a monomeric compound containing a $CH_2=C<$ group, and (C) a compound serving (1) to inhibit polymerization of said polymerizable components at room temperature in the absence of a peroxide catalyst and (2) to accelerate said polymerization when a peroxide catalyst is added to said composition, said compound consisting of between about 0.0005 and 1 percent by weight of a sulfonium salt of an acid that has an ionization constant greater than about $1 \times 10^{-5}$, subsequently intermixing a peroxide catalyst with the thus stabilized polyester composition for polymerizing said polymerizable components under the polymerization-accelerating action of said compound, and hastening said polymerization by heating said composition to a temperature above about 60° C.

2. A storable liquid polyester composition which is stable at substantially room temperature in the absence of a peroxide catalyst, said composition consisting essentially of a mixture of:
   (A) a polymerizable unsaturated alkyd resin having a plurality of alpha, beta ethylenically unsaturated groups;
   (B) an ethylenically unsaturated monomer which is polymerizable with said alkyd resin; and
   (C) a dissolved stabilizing agent selected from the group consisting of:
      (1) sulphonium salts of acids that have an ionization constant greater than $1 \times 10^{-5}$; and
      (2) mixtures of such sulphonium salts with a retardant selected from the group consisting of dihydric phenols and quinones,
   said stabilizing agent serving:
      (a) to inhibit polymerization of said polymerizable components at room temperature in the absence of a peroxide catalyst; and
      (b) to accelerate said polymerization when a peroxide catalyst is added to said composition.

3. The composition of claim 2 in which said stabilizing agent is present in an amount of between about 0.0005 and one percent by weight of said composition.

4. The composition of claim 2 in which said sulphonium salt contains three phenyl radicals.

5. The composition of claim 3, in which said sulphonium salt contains two methyl radicals and one benzyl radical.

6. The method of stabilizing a liquid polyester mixture of a polymerizable unsaturated alkyd resin having a plurality of alpha, beta ethylenically unsaturated groups, an ethylenically unsaturated monomer which is polymerizable with said alkyd resin, said method consisting essentially of intermixing with said polymerizable mixture a small amount of a stabilizing agent selected from the group consisting of:
   (1) sulphonium salts of an acid that has an ionization constant greater than about $1 \times 10^{-5}$; and
   (2) mixtures of such sulphonium salts with a retardant selected from the group consisting of dihydric phenols and quinones,
said stabilizing agent serving:
   (a) to inhibit polymerization of said polymerizable components at room temperature in the absence of a peroxide catalyst; and
   (b) to accelerate said polymerization when a peroxide catalyst is added to said composition.

7. The method of claim 6 in which said stabilizing agent is dissolved in one of the polymerizable components before said polymerizable alkyd resin and monomer polymerizable therewith are intermixed.

8. The method of claim 6 in which the amount of said stabilizing agent is between about 0.0005 and one percent by weight of the composition.

References Cited in the file of this patent

UNITED STATES PATENTS

| 2,593,787 | Parker | Apr. 22, 1952 |
| 2,740,765 | Parker | Apr. 3, 1956 |
| 2,815,333 | Klein et al. | Dec. 3, 1957 |
| 2,946,770 | Bader et al. | July 26, 1960 |

FOREIGN PATENTS

| 759,535 | Great Britain | Oct. 17, 1956 |
| 792,812 | Great Britain | Apr. 2, 1958 |

UNITED STATES PATENT OFFICE
CERTIFICATE OF CORRECTION

Patent No. 3,028,361

April 3, 1962

Irving M. Abrams et al.

It is hereby certified that error appears in the above numbered patent requiring correction and that the said Letters Patent should read as corrected below.

Column 6, line 32, for "base" read -- based --; line 57, for "2,4-dichlorobenzyl" read -- 2,4-dichlorobenzoyl --; line 71, for "perferably" read -- preferably --; column 8, line 10, for "syrene" read -- styrene --; column 9, line 70, for "quainone" read -- quinone --.

Signed and sealed this 24th day of July 1962.

Attest:

ERNEST W. SWIDER
Attesting Officer

DAVID L. LADD
Commissioner of Patents